United States Patent
Knox et al.

(10) Patent No.: US 9,760,412 B2
(45) Date of Patent: Sep. 12, 2017

(54) CLIENT SERVER COMMUNICATION SYSTEM

(75) Inventors: Richard I. Knox, Lochwinnoch (GB); James K. MacKenzie, Largs (GB)

(73) Assignee: International Business Machines Corporation, Armonk, NY (US)

( * ) Notice: Subject to any disclaimer, the term of this patent is extended or adjusted under 35 U.S.C. 154(b) by 1738 days.

(21) Appl. No.: 13/172,924

(22) Filed: Jun. 30, 2011

(65) Prior Publication Data

US 2013/0007094 A1 Jan. 3, 2013

(51) Int. Cl.
*G06F 9/54* (2006.01)

(52) U.S. Cl.
CPC .......... *G06F 9/54* (2013.01); *G06F 2209/541* (2013.01)

(58) Field of Classification Search
CPC ................................. G06F 9/54; G06F 21/305
See application file for complete search history.

(56) References Cited

U.S. PATENT DOCUMENTS

| | | | |
|---|---|---|---|
| 7,069,560 B1 | 6/2006 | Cheyer et al. | |
| 7,088,718 B1 | 8/2006 | Srivastava | |
| 7,254,607 B2 | 8/2007 | Hubbard et al. | |
| 2002/0069238 A1* | 6/2002 | Eard et al. ..................... | 709/202 |
| 2003/0149765 A1 | 8/2003 | Hubbard et al. | |
| 2005/0159823 A1 | 7/2005 | Hayes et al. | |
| 2008/0225837 A1 | 9/2008 | Brown et al. | |
| 2009/0055489 A1* | 2/2009 | Agarwal et al. .............. | 709/206 |
| 2009/0138602 A1* | 5/2009 | Schneider ..................... | 709/227 |
| 2010/0318676 A1* | 12/2010 | Srivastava et al. ........... | 709/238 |
| 2011/0022812 A1 | 1/2011 | van der Linden et al. | |
| 2011/0047204 A1 | 2/2011 | Mansoor et al. | |
| 2011/0119381 A1* | 5/2011 | Glover et al. ................ | 709/226 |
| 2013/0007093 A1 | 1/2013 | Knox et al. | |
| 2013/0007095 A1 | 1/2013 | Knox et al. | |
| 2013/0007841 A1 | 1/2013 | Knox et al. | |

OTHER PUBLICATIONS

Knox et al., U.S. Appl. No. 13/172,919, filed Jun. 30, 2011, 48 pages.
Knox et al., U.S. Appl. No. 13/439,680, filed Apr. 4, 2012, 47 pages.
Knox et al., U.S. Appl. No. 13/446,151, filed Apr. 13, 2012, 48 pages.
"Managing Multivendor Networks—Chapter 11—Network Management", QUE, Apr. 1, 1997, pp. 1-19 http://www.podgoretsky.com/ftp/docs/Internet/Managing Multivendor Networks.

(Continued)

*Primary Examiner* — Suraj Joshi
(74) *Attorney, Agent, or Firm* — Yee & Associates, P.C.; Richard A. Wilhelm

(57) ABSTRACT

Apparatus for communicating with a server application. A first request is received by a first agent application on a first client computer system from the server application to request that a second agent application on a second client computer system communicate with the server application. Responsive to receiving the first request, a second request is sent by the first agent application to the second agent application on the second client computer system to communicate with the server application.

18 Claims, 11 Drawing Sheets

(56) References Cited

OTHER PUBLICATIONS

"Configuring channels with NIO-based endpoints", Adobe, pp. 1-15 retrieved Mar. 11, 2011 http://help.adobe.com/en_US/LiveCycleDataServicesES/3.1/Developing/WSc3ff6d0ea77859461172e0811f00f7045b-7fc5Update.html.

Mell et al., "The NIST Definition of Cloud Computing (Draft)", Recommendations of the National Institute of Standards and Technology, U.S. Department of Commerce, Jan. 2011, pp. 1-7.

Office Action, dated Aug. 15, 2014, regarding U.S. Appl. No. 13/172,919, 25 pages.

Final Office Action, dated Jan. 13, 2015, regarding U.S. Appl. No. 13/172,919, 16 pages.

Office Action, dated Jan. 12, 2015, regarding U.S. Appl. No. 13/446,151, 21 pages.

Office Action, dated Jan. 12, 2015, regarding U.S. Appl. No. 13/439,680, 21 pages.

Notice of Allowance, dated Apr. 7, 2017, regarding U.S. Appl. No. 13/172,919, 8 pages.

\* cited by examiner

CLIENT SERVER COMMUNICATION SYSTEM

BACKGROUND OF THE INVENTION

1. Field of the Invention

The present disclosure relates generally to network data processing systems and, in particular, to a method and apparatus for communications between a client and a server.

2. Description of the Related Art

In a network data processing system, server computers may provide resources to client devices. These client devices may be, for example, a computer, a mobile phone, a switch, and/or other suitable types of devices. A server application in a server computer may monitor or control remote devices. The monitoring or control may be performed by an agent application running on the remote device.

Communications between an agent application and a server application may be performed in a number of different ways. For example, an agent application may periodically contact a server to send status updates. The agent also may check for any work that may need to be performed. This work may include, for example, changes in configuration, installing software, and other suitable types of work.

An agent also may communicate with a server by listening to a socket for communications from a server application. A socket, in these examples, is an endpoint for communication flows. A socket may take the form of an application programming interface in a transmission control protocol/Internet protocol stack. This type of socket is a listening socket. When the agent application accepts an inbound request for communications, the server application may communicate with the agent application. The server application may send requests for status information, send commands, and make other requests of the agent application.

In another example, a persistent connection may be present between the server application and the agent application. The agent application may contact the server and maintain a connection that allows for communications to flow in both directions.

SUMMARY OF THE INVENTION

In these illustrative embodiments, apparatus, and computer program product for communicating with a server application is provided. A first request is received by a first agent application on a first client computer system from the server application to request to instruct a second agent application on a second client computer system to communicate with the server application. Responsive to receiving the first request, a second request is sent by the first agent application to the second agent application on the second client computer system to communicate with the server application.

DETAILED DESCRIPTION OF THE EMBODIMENT

Figure 1:
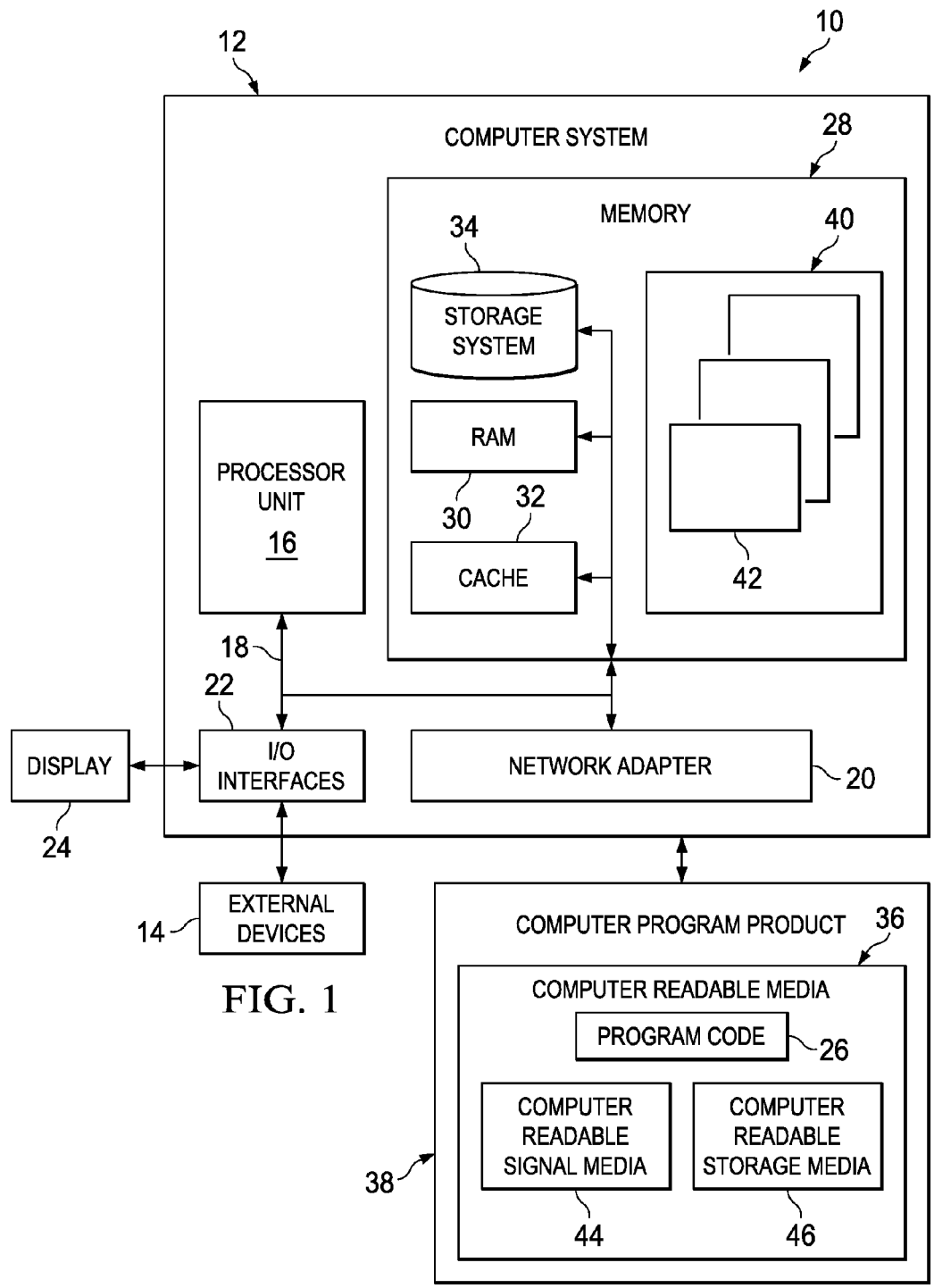
FIG. 1 is a block diagram of an example of a cloud computing node in accordance with an illustrative embodiment.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, without limitation, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination of the foregoing. In the context of this document, a computer readable storage medium may be any tangible medium that can contain or store a program for use by or in connection with an instruction processing system, apparatus, or device.

A computer readable signal medium may include a propagated data signal with computer readable program code embodied therein, for example, in baseband or as part of a carrier wave. Such a propagated signal may take any of a variety of forms, including, without limitation, electromagnetic, optical, or any suitable combination thereof. A computer readable signal medium may be any computer readable medium that is not a computer readable storage medium and that can communicate, propagate, or transport a program for use by or in connection with an instruction processing system, apparatus, or device.

Program code embodied on a computer readable medium may be transmitted using any appropriate medium, including, without limitation, wireless, wireline, optical fiber cable, RF, etc., or any suitable combination of the foregoing.

Computer program code for carrying out operations for aspects of the present invention may be written in any combination of one or more programming languages, including an object-oriented programming language, such as Java, Smalltalk, C++, or the like, and conventional procedural programming languages, such as the "C" programming language or similar programming languages. The program code may run entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN), a wide area network (WAN), or the connection may be made to an external computer (for example, through the Internet using an Internet Service Provider).

Aspects of the present invention are described below with reference to flowcharts and/or block diagrams of methods, apparatus (systems), and computer program products according to embodiments of the invention. It will be understood that each block of the flowcharts and/or block diagrams, and combinations of blocks in the flowcharts and/or block diagrams, can be implemented by computer program instructions. These computer program instructions may be provided to a processor of a general purpose computer, special purpose computer, or other programmable data processing apparatus to produce a machine, such that the instructions, which are processed via the processor of the computer or other programmable data processing apparatus, that create means for implementing the functions/acts specified in the flowchart and/or block diagram block or blocks.

These computer program instructions may also be stored in a computer readable medium that can direct a computer, other programmable data processing apparatus, or other devices to function in a particular manner such that the instructions stored in the computer readable medium produce an article of manufacture including instructions, which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer-implemented process such that the instructions, which are processed on the computer or other programmable apparatus, provide processes for implementing the functions/acts specified in the flowchart and/or block diagram block or blocks. It is understood in advance that although this disclosure includes a detailed description of cloud computing, implementation of the teachings recited herein are not limited to a cloud computing environment. Rather, the illustrative embodiments are capable of being implemented in conjunction with any other type of computing environment now known or later developed.

For convenience, the disclosure includes the following definitions, which have been derived from the "Draft NIST Working Definition of Cloud Computing" by Peter Mell and Tim Grance, dated Oct. 7, 2009, which is cited in an information disclosure statement filed herewith.

Cloud computing is a model of service delivery for enabling convenient, on-demand network access to a shared pool of configurable computing that can be rapidly provisioned and released with minimal management effort or interaction with a provider of the service. The computer resources may be, for example, resource networks, network bandwidth, servers, processing, memory, storage, applications, virtual machines, and services. This cloud model may include at least five characteristics, at least three service models, and at least four deployment models.

Characteristics include on-demand self-service, broad network access, resource pooling, rapid elasticity, and measured service. With on-demand self-service, a cloud consumer can unilaterally provision computing capabilities as needed automatically without requiring human interaction with the service's provider. The computer capabilities include, for example, server time and network storage.

Broad network access involves capabilities that are available over a network and accessed through standard mechanisms that promote use by heterogeneous thin or thick client platforms, such as mobile phones, laptops, and personal digital assistants (PDAs). With resource pooling, the provider's computing resources are pooled to serve multiple consumers using a multi-tenant model with different physical and virtual resources dynamically assigned and reassigned according to demand. There is a sense of location independence in that the consumer generally has no control or knowledge over the exact location of the provided resources but may be able to specify a location at a higher level of abstraction. The higher level of abstraction may be, for example, a country, state, or datacenter.

Rapid elasticity involves capabilities that can be rapidly and elastically provisioned, in some cases automatically, to quickly scale out and rapidly release to quickly scale in. To the consumer, the capabilities available for provisioning often appear to be unlimited and can be purchased in any quantity at any time.

With measured service, cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service models include software as a service (SaaS), platform as a service (PaaS), and infrastructure as a service (IaaS). With software as a service (SaaS), a capability is provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a service (PaaS) is a capability provided to the consumer to deploy onto the cloud infrastructure consumer-created or acquired applications created using programming languages and tools supported by the provider. The consumer does not manage or control the underlying cloud infrastructure including networks, servers, operating systems, or storage. Instead, the consumer has control over the deployed applications and possibly application hosting environment configurations.

Infrastructure as a service (IaaS) is a capability provided to the consumer to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components. These network components include, for example, host firewalls.

Deployment models include, for example, a private cloud, a community cloud, a public cloud, and a hybrid cloud. A private cloud has a cloud infrastructure that is operated solely for an organization. This type of cloud may be managed by the organization or a third party and may exist on-premises or off-premises.

A community cloud is the cloud infrastructure that is shared by several organizations and supports a specific community that has shared concerns. These concerns include, for example, mission, security requirements, policy, and compliance considerations. A community cloud may be managed by the organizations or a third party. This type of cloud may exist on-premises or off-premises.

A public cloud is the cloud infrastructure that is made available to the general public or a large industry group and is owned by an organization selling cloud services.

A hybrid cloud is the cloud infrastructure that is a composition of two or more clouds. For example, without limitation, a hybrid cloud may be a combination of two or more of a private cloud, a community cloud, and/or a public cloud. A hybrid cloud includes clouds that remain unique entities but are bound together by standardized or proprietary technology that enables data and application portability. The data and application portability includes, for example, cloud bursting for load-balancing between clouds that form the hybrid cloud.

A cloud computing environment is service oriented with a focus on statelessness, low coupling, modularity, and semantic interoperability. At the heart of cloud computing is an infrastructure comprising a network of interconnected nodes.

The computer program instructions may also be loaded onto a computer, other programmable data processing apparatus, or other devices to cause a series of operational steps to be performed on the computer, other programmable apparatus, or other devices to produce a computer-implemented process such that the instructions, which run on the computer or other programmable apparatus, provide processes for implementing the functions/acts specified in the flowchart and/or block diagram block or blocks.

With reference now to FIG. 1, a block diagram of an example of a cloud computing node is depicted in accordance with an illustrative embodiment. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program modules, being run by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in cloud computing node 10 is shown in the form of a general-purpose computing device. The components of computer system 12 may include, but are not limited to, one or more processors in processor unit 16, memory 28, and bus 18 that couples various system components, including memory 28, to processor unit 16.

Processor unit 16 processes instructions for software that may be loaded into memory 28. Processor unit 16 may be a number of processors, a multi-processor core, or some other type of processor, depending on the particular implementation. "A number", as used herein with reference to an item, means one or more items. Further, processor unit 16 may be implemented using a number of heterogeneous processor systems in which a main processor is present with secondary processors on a single chip. As another illustrative example, processor unit 16 may be a symmetric multi-processor system containing multiple processors of the same type.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, and removable and non-removable media.

Memory 28 can include computer system readable media in the form of volatile memory, such as random access memory (RAM) 30 and/or cache 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk, such as a CD-ROM, DVD-ROM, or other optical media, can be provided. In such instances, each can be connected to bus 18 by one or more data media interfaces. As will be further depicted and described below, memory 28 may include at least one program product having a set of program modules that are configured to carry out the functions of embodiments of the invention. As used herein, "a set", when referring to items, means one or more items.

Program/utility 40, having a set of program modules 42, may be stored in memory 28. Memory 28 may also store, for example, without limitation, an operating system, one or more application programs, other program modules, and program data. Each of the operating systems, one or more application programs, other program modules, program data, or some combination thereof may include an implementation of a networking environment. Program modules 42 generally carry out the functions and/or methodologies of embodiments of the invention as described herein.

Computer system 12 may also communicate with one or more external devices 14, such as a keyboard, a pointing device, display 24, etc.; one or more devices that enable a user to interact with computer system 12; and/or any devices (e.g., network card, modem, etc.) that enable computer system 12 to communicate with one or more other computing devices. Such communication can occur via I/O interfaces 22. Still yet, computer system 12 can communicate with one or more networks, such as a local area network (LAN), a general wide area network (WAN), and/or a public network (e.g., the Internet) via network adapter 20. As depicted, network adapter 20 communicates with the other components of computer system 12 via bus 18. It should be understood that, although not shown, other hardware and/or software components could be used in conjunction with computer system 12. Examples include, but are not limited to, microcode, device drivers, redundant processor units, external disk drive arrays, RAID systems, tape drives, data archival storage systems, etc.

Instructions for the operating system, applications, and/or programs may be located in storage devices in memory 28. In these illustrative examples, the instructions are in a functional form on storage system 34. These instructions may be loaded into random access memory 30 for processing by processor unit 16.

These instructions are referred to as program code, computer usable program code, or computer readable program code that may be read and run by a processor in processor unit 16. The program code in the different embodiments may be embodied on different physical or computer readable storage media, such as random access memory 30 or storage system 34.

Program code 26 is located in a functional form on computer readable media 36 that is selectively removable and may be loaded onto or transferred to computer system 12 for processing by processor unit 16. Program code 26 and computer readable media 36 form computer program product 38 in these examples. In one example, computer readable media 36 may be computer readable storage media 46 or computer readable signal media 44. Computer readable storage media 46 may include, for example, an optical or magnetic disk that is inserted or placed into a drive or other device that is part of a persistent storage transfer onto a storage device, such as a hard drive, that is part of the persistent storage. Computer readable storage media 46 also may take the form of a persistent storage, such as a hard drive, a thumb drive, or a flash memory, that is connected to computer system 12. In some instances, computer readable storage media 46 may not be removable from computer system 12. In these examples, computer readable storage media 46 is a physical or tangible storage device used to store program code 26 rather than a medium that propagates or transmits program code 26. Computer readable storage media 46 is also referred to as a computer readable tangible storage device or a computer readable physical storage device. In other words, computer readable storage media 46 is a media that can be touched by a person.

Alternatively, program code 26 may be transferred to computer system 12 using computer readable signal media 44. Computer readable signal media 44 may be, for example, a propagated data signal containing program code 26. For example, computer readable signal media 44 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in these illustrative examples.

In some illustrative embodiments, program code 26 may be downloaded over a network to a persistent storage in computer system 12 from another device or data processing system through computer readable signal media 44 for use within computer system 12. For instance, program code stored in a computer readable storage medium in a server data processing system may be downloaded over a network from the server to computer system 12. The data processing system providing program code 26 may be a server computer, a client computer, or some other device capable of storing and transmitting program code 26.

Figure 2:
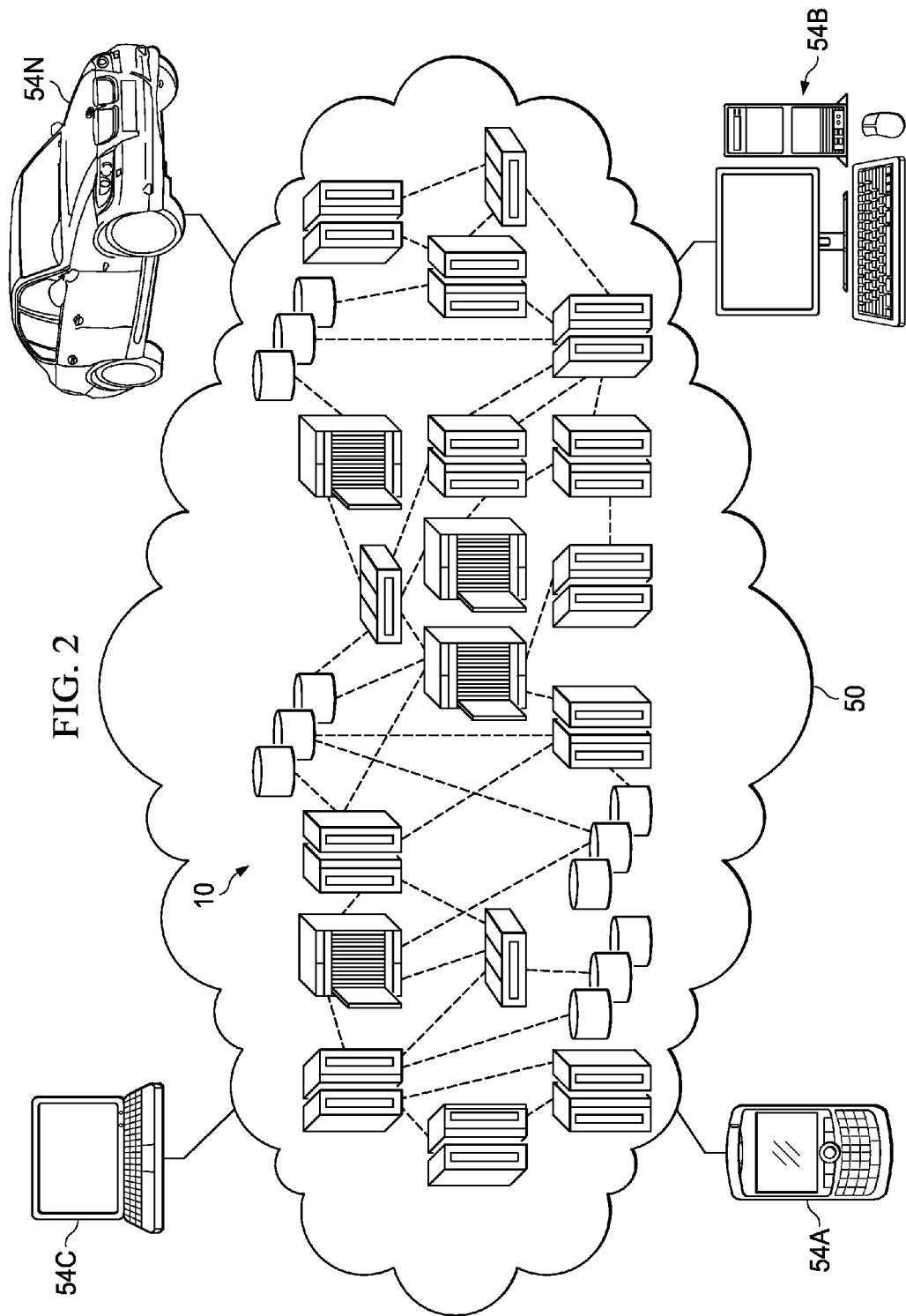
FIG. 2 is an illustration of a cloud computing environment in accordance with an illustrative embodiment.

Referring now to FIG. 2, an illustration of a cloud computing environment is depicted in accordance with an illustrative embodiment. As illustrated, cloud computing environment 50 comprises one or more cloud computing nodes, such as cloud computing node 10 in FIG. 1. One or more cloud computing nodes may communicate with local computing devices used by cloud consumers, such as, for example, without limitation, a personal digital assistant (PDA) or a cellular telephone 54A, desktop computer 54B, laptop computer 54C, and/or automobile computer system 54N. Cloud computing node 10 may communicate with other cloud computing nodes. They may be grouped (not shown) physically or virtually, in one or more networks, such as private, community, public, or hybrid clouds, as described hereinabove, or a combination thereof. This allows cloud computing environment 50 to offer infrastructure, platforms, and/or software as services for which a cloud consumer does not need to maintain resources on a local computing device.

It is understood that the types of computing devices 54A-N shown in FIG. 2 are intended to be illustrative only and that cloud computing nodes 10 and cloud computing environment 50 can communicate with any type of computerized device over any type of network and/or network addressable connection (e.g., using a web browser). Program code located on one of cloud computing node 10 may be stored on a computer recordable storage medium in one of cloud computing node 10 and downloaded to a computing device within computing devices 54A-N over a network for use in these computing devices. For example, a server computer in cloud computing node 10 may store program code on a computer readable storage medium on the server computer. The server computer may download the program code to a client computer in computing devices 54A-N for use on the client computer.

Figure 3:
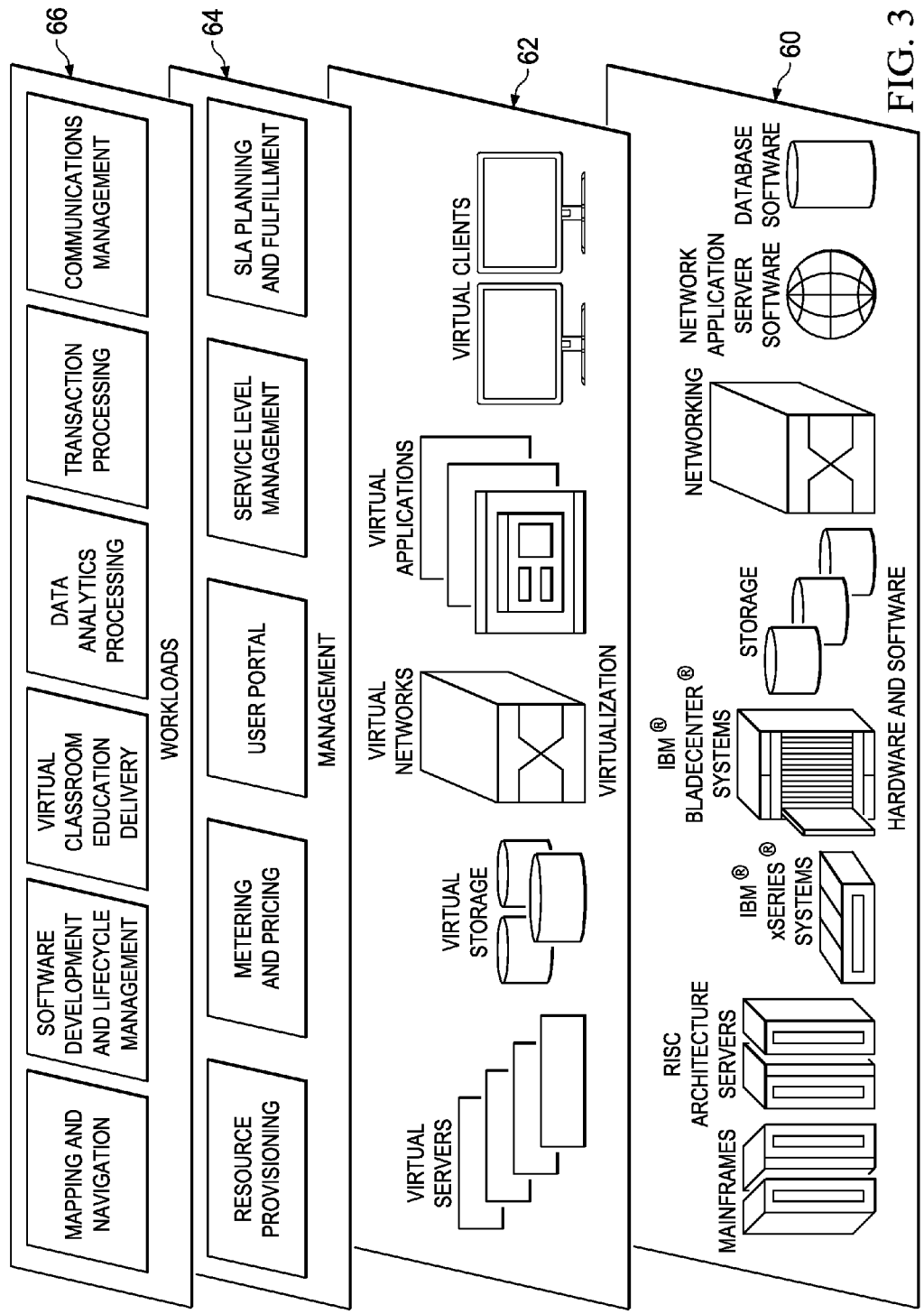
FIG. 3 is an illustration of model layers in accordance with an illustrative embodiment.

With reference now to FIG. 3, an illustration of model layers is depicted in accordance with an illustrative embodiment. The model layers are a set of functional abstraction layers provided by a cloud computing environment, such as cloud computing environment 50 in FIG. 2. It should be understood in advance that the components, layers, and functions shown in FIG. 3 are intended to be illustrative only and the embodiments of the invention are not limited thereto. As depicted, the following layers and corresponding functions are provided:

Hardware and software layer 60 includes hardware and software components. Examples of hardware components include mainframes, for example, IBM® zSeries® systems; RISC (Reduced Instruction Set Computer) architecture based servers, for example, IBM pSeries® systems; IBM xSeries® systems; IBM BladeCenter® systems; storage devices; networks; and networking components. Examples of software components include network application server software, for example, IBM WebSphere® application server software; and database software, for example, IBM DB2® database software. (IBM, zSeries, pSeries, xSeries, Blade-Center, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide resource provisioning, metering and pricing, a user portal, service level management, and/or service level agreement (SLA) planning and fulfillment. Resource provisioning provides dynamic procurement of computing resources and other resources that are utilized to perform tasks within the cloud computing environment. Metering and pricing provide cost tracking as resources are utilized within the cloud computing environment and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement planning and fulfillment provide pre-arrangement for and procurement of cloud computing resources for which a future requirement is anticipated in accordance with an SLA.

Workloads layer 66 provides examples of functionality for which the cloud computing environment may be utilized. Examples of workloads and functions, which may be provided from this layer include: mapping and navigation, software development and lifecycle management, virtual classroom education delivery, data analytics processing, transaction processing, and communications management. With respect to communications, one or more of the illustrative embodiments may be implemented to provide communications between server applications and agent applications in workloads layer 66. These communications may be used to manage devices on which the agent applications are located.

The different illustrative embodiments recognize and take into account a number of different considerations. The different illustrative embodiments recognize and take into account that with polling, the interval time at which polling occurs needs to be short enough so that requests can be processed. However, if the polling interval is too short, traffic may occur even when no work is being performed. As a result, a decrease in available bandwidth for other traffic may occur in the network.

With agent applications using listening sockets, commands may be delivered quickly to the agent application. The delay present with polling does not occur. Further, network bandwidth is not consumed in an unnecessary fashion. In other words, traffic does not occur when work is not present. Using listening sockets, however, may require a reconfiguration of any firewalls between the server process and agent application to allow traffic between these two processes. The different illustrative embodiments recognize and take into account that with cloud-based systems, firewalls typically only allow traffic in one direction. As a result, the use of listening sockets may be more difficult with cloud computing.

The different illustrative embodiments recognize and take into account that persistent connections may avoid the need to reconfigure a firewall. Further, a persistent connection also may allow for more timely delivery of urgent commands from the server to the client. The different illustrative embodiments recognize and take into account that each point of connection between a server application and a client process may use resources that are limited. These and other solutions also may require changes to the infrastructure of a network. These changes typically require time and expense. As a result, the different illustrative embodiments recognize and take into account that the scalability of this technique may be limited.

Thus, the different illustrative embodiments provide a method and apparatus for providing communications between server applications and client processes. The different illustrative embodiments provide the capability to deliver messages that may require processing more quickly as compared to other messages. These messages may be delivered without needing reconfiguration of firewalls or dedicated infrastructures.

With listening sockets, additional infrastructure in terms of server computers and server applications may be needed.

Figure 4:
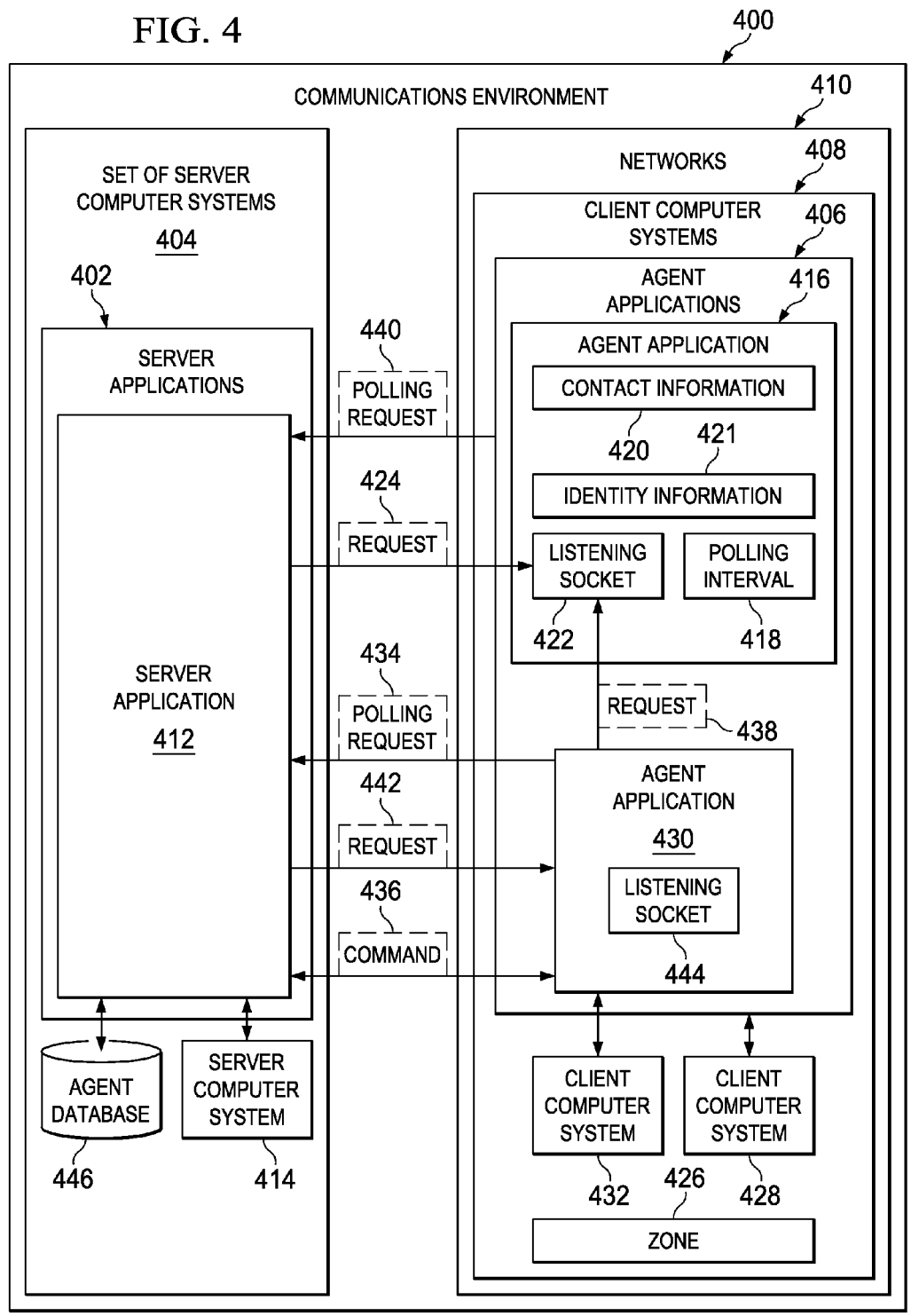
FIG. 4 is a block diagram of a communications environment in accordance with an illustrative embodiment.

With reference now to FIG. 4, a block diagram of a communications environment is depicted in accordance with an illustrative embodiment. Communications environment 400 is an example of an environment that may be in workloads layer 66 in FIG. 3. More specifically, communications environment 400 may be used to provide communications management in workloads layer 66. As depicted, server applications 402 run on set of server computer systems 404. "A set", as used herein with reference to items, means one or more items. For example, "a set of server computer systems" is one or more server computer systems.

In these illustrative examples, set of server computer systems 404 may be implemented using computer system 12 in FIG. 1. Agent applications 406 run on client computer systems 408. In these illustrative examples, client computer systems 408 may be implemented using computer system 12 in FIG. 1. Client computer systems 408 are located in networks 410.

Server applications 402 on set of server computer systems 404 and agent applications 406 on client computer systems 408 communicate with each other in these illustrative examples. For example, server application 412 in server applications 402 running on server computer system 414 in set of server computer systems 404 may communicate with one or more agent applications 406 running on client computer systems 408.

Additionally, agent applications 406 may also communicate with server application 412. For example, agent applications 406 may periodically poll server application 412. Agent applications 406 may provide a status or availability of agent applications 406 through polling server application 412. In these illustrative examples, agent applications 406 may poll server application 412.

For example, agent application 416 has polling interval 418. Polling interval 418 is a time period after which agent application 416 polls server application 412. In other words, when polling interval 418 occurs, agent application 416 initiates communication with server application 412. In these illustrative examples, agent application 416 sends contact information 420 and identity information 421 to server application 412. Contact information 420 comprises addresses that may be used to communicate with agent application 416. In these illustrative examples, identity information 421 is an identity for the network on which agent application 416 is located.

In these illustrative examples, agent application 416 may be contacted by server application 412 using listening socket 422. Listening socket 422 is a construct that may be used to receive communications from server application 412.

In these illustrative examples, commands from server application 412 are not received through listening socket 422. Instead, server application 412 identifies itself to agent application 416 through listening socket 422. For example, server application 412 may authenticate itself. This authentication may be performed by sending a certificate or credentials. This authentication process is optional and may not be used in other illustrative examples.

When an authenticated connection is present on listening socket 422, agent application 416 initiates communication with server application 412. The initiation of communication with server application 412 occurs even if polling interval 418 has not occurred yet.

When server application 412 desires to communicate with agent application 416, server application 412 sends request 424 to listening socket 422. As discussed above, request 424 may include authentication information as well as identifying information about server application 412. When agent application 416 initiates communication with server application 412, server application 412 may then send commands, data, program code, and other information to agent application 416.

In some cases, agent application 416 may not respond to request 424. This situation may occur for various reasons. For example, server application 412 may be unable to reach agent application 416 because of a firewall between server application 412 and agent application 416.

In this case, server application 412 may be unable to initiate communication with agent application 416. Server application 412 may then wait until agent application 416 again communicates with server application 412.

In some cases, the need to communicate with agent application 416 may be urgent enough that waiting for agent application 416 to initiate communications is undesirable. In these illustrative examples, server application 412 may identify zone 426 for client computer system 428 on which agent application 416 is running. Server application 412 may then wait for another agent application in the same zone to send a polling request to server application 412. For example, if agent application 430 running on client computer system 432 sends polling request 434 to server application 412, server application 412 may identify agent application 430 as being in the same zone, zone 426, as agent application 416.

In these illustrative examples, zone 426 is a grouping of computer systems. In particular, computer systems within zone 426 are selected such that they are able to communicate with each other. For example, computer systems within zone 426 may be in the same network or another network. In other words, agent applications running on client computer systems grouped into zone 426 may not have the same issues or problems in communicating with each other as server application 412 running on server computer system 414. For example, firewalls or other architectural restrictions may be absent in a client computer system selected for zone 426.

In these illustrative examples, agent application 430 may send polling request 434 prior to the time when agent application 416 is scheduled to send a polling request. As a result, server application 412 is able to establish communication with agent application 430. In these illustrative examples, server application 412 sends command 436 to agent application 430.

Command 436, in these illustrative examples, is a command that causes agent application 430 to send request 438 to listening socket 422 of agent application 416.

Command 436, in these illustrative examples, is a command that causes agent application 430 to send request 438 to listening socket 422 of agent application 416. Request 438 is not a request for agent application 416 to communicate with agent application 430 in these illustrative examples. Instead, request 438 is a request for agent application 416 to communicate with server application 412. In these illustrative examples, the configuration of networks 410 is made such that agent application 430 is able to communicate with agent application 416 when server application 412 is unable to communicate with agent application 416.

In response, agent application 416 sends polling request 440 to server application 412. Polling request 440 occurs sooner than scheduled in response to request 438 received from agent application 430.

In another illustrative example, server application 412 may send request 442 to listening socket 444 for agent application 430. In response, agent application 430 initiates communication with server application 412. When that communication is initiated, server application 412 sends command 436.

As depicted, server application 412 may use agent database 446 to select agent application 430. Agent database 446 identifies agent applications in agent applications 406 that may be used to send requests to an agent application that does not respond to the server application.

Each agent application in agent applications 406 is configured to communicate with another agent application in response to a request from a server application. In this manner, server application 412 may communicate with agent application 416 with less delay. In these illustrative examples, agent application 430 functions as a proxy for server application 412 when server application 412 is unable to reach agent application 416.

As a result, polling intervals, such as polling interval 418, may be increased to reduce traffic on networks. For example, polling interval 418 may be increased to one hour intervals.

When server application 412 needs to communicate with agent application 416 and is unable to do so through listening socket 422, the delay may be reduced from the remaining time intervals to seconds when command 436 is used. For example, if forty minutes are left until agent application 416 is again to poll server application 412 again and agent application 416 does not receive request 424 through listening socket 422, server application 412 may send request 442 to agent application 430 over listening socket 444. By sending command 436, agent application 430 uses request 438 to cause agent application 416 to communicate with server application 412.

This process may take seconds rather than minutes. In this manner, issues with the use of bandwidth on networks and changing network infrastructures may be avoided with communications environment 400.

The illustration of communications environment 400 in FIG. 4 is not meant to imply any physical or architectural limitation in which an illustrative embodiment may be implemented. Other components in addition to and/or in place of the ones illustrated may be used. Some components may be unnecessary. Also, the blocks are presented to illustrate some functional components. One or more of these blocks may be combined and/or divided into different blocks when implemented in an illustrative embodiment.

For example, in some illustrative examples, a server application in server applications 402 may function as an agent application. In other words, server application 412 may send a request to another server application when server application 412 is unable to contact agent application 416. That other server application may then send a request to communicate with server application 412 to listening socket 422 for agent application 416.

Figure 5:
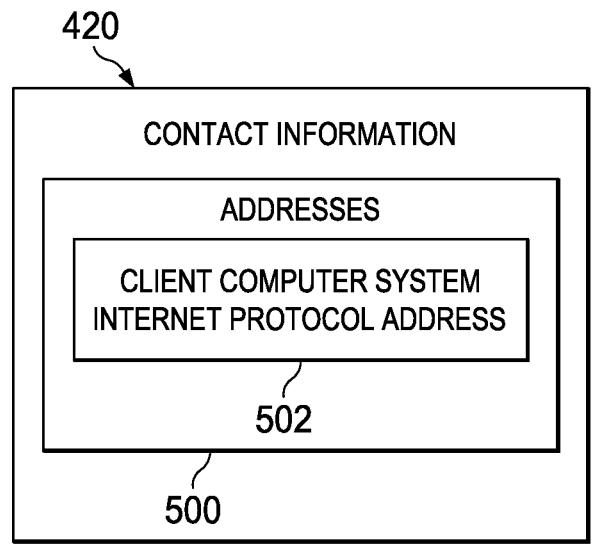
FIG. 5 is an illustration of contact information in accordance with an illustrative embodiment.

With reference now to FIG. 5, an illustration of contact information is depicted in accordance with an illustrative embodiment. In this illustrative example, an example of an implementation for contact information 420 in FIG. 4 is depicted. In this illustrative example, contact information 420 includes addresses 500.

As depicted, addresses 500 includes client computer system Internet protocol address 502. This address is the address of the client computer system on which the client agent is located. This information is sent to the server application each time the agent application contacts the server application and the information has changed. In some cases, this information may be sent every time the agent application contacts the server application. In these illustrative examples, each agent tracks its own address and notifies the server application of its address Turning next to FIG. 6, an illustration of identity information is depicted in accordance with an illustrative embodiment. In this depicted example, identity information 421 includes router Internet protocol address 600 and router media access control address 602. These addresses are addresses for router use by the client computer system. In particular, the router is the default router for the client computer system on which the agent application runs. This information also is supplied to the server application each time the agent application contacts the server application and the information has changed in these illustrative examples.

Figure 6:
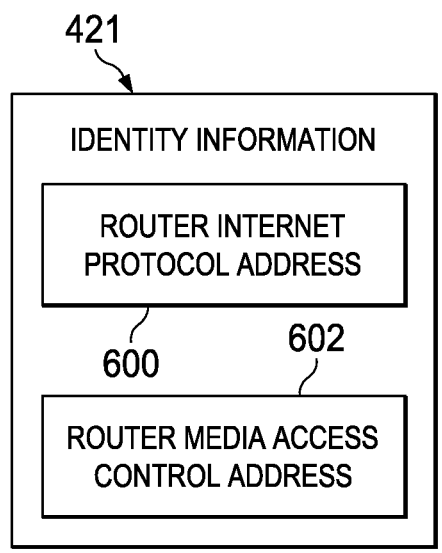
FIG. 6 is an illustration of identity information in accordance with an illustrative embodiment.

The illustration of addresses 500 for contact information 420 in FIG. 5 and router Internet protocol address 600 and router media access control address 602 for identity information 421 in FIG. 6 is not meant to imply limitations to the manner in which contact information 420 and identity information 421 may be implemented. For example, the client computer system on which the agent application is located may have more than one Internet protocol address. Those additional addresses may be included in addresses 500.

In another illustrative example, other types of information may be used in identity information 421 to identify a network on which an agent application is located. This information may be any information that the agent application can identify.

Figure 7:
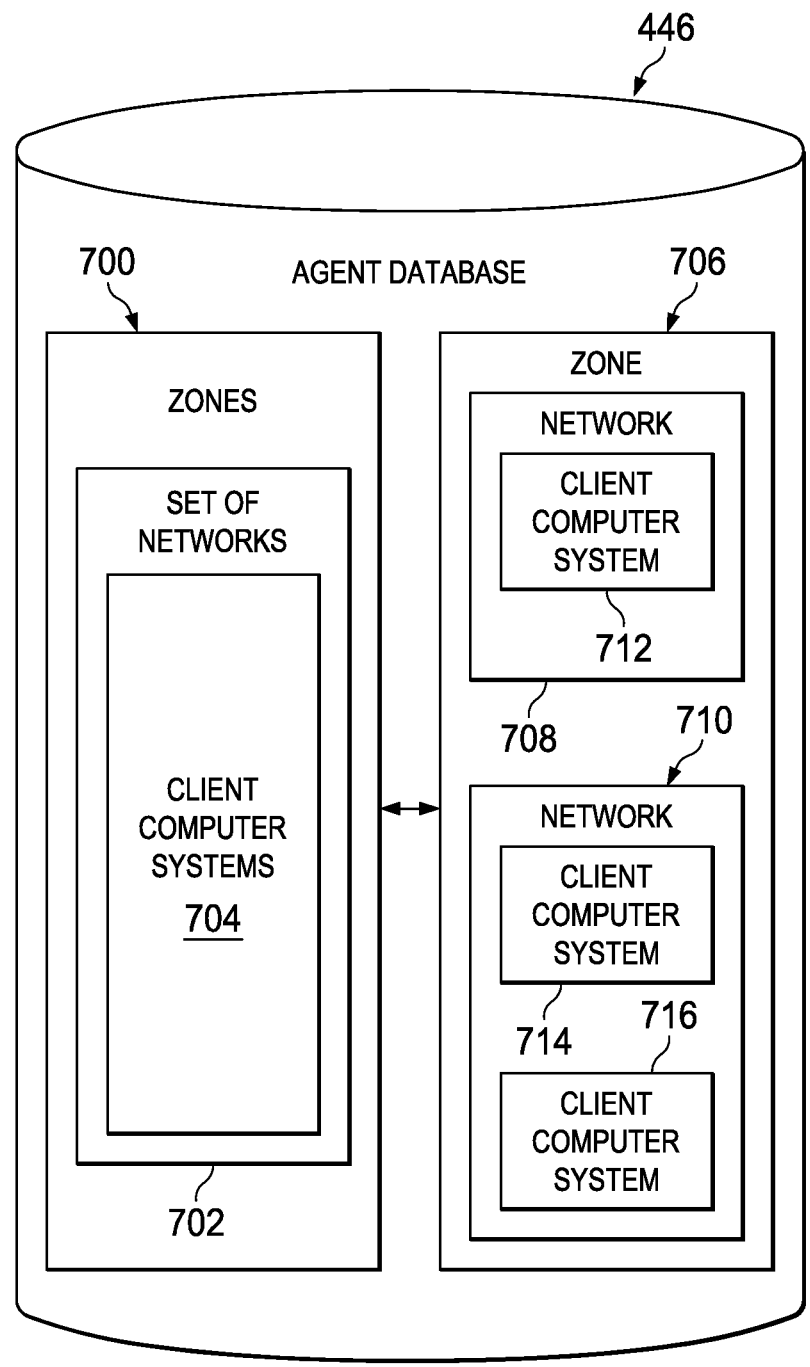
FIG. 7 is an illustration of an implementation for an agent database in accordance with an illustrative embodiment.

With reference now to FIG. 7, an illustration of an implementation for an agent database is depicted in accordance with an illustrative embodiment. In this illustrative example, an example of information in agent database 446 is depicted. In these illustrative examples, agent database 446 has zones 700. Within zones 700 is set of networks 702 containing client computer systems 704. "A set", as used herein with reference to items, means one or more items. For example, "a set of networks" is one or more networks.

In selecting networks for a zone, the zones may be selected such that networks may have access to each other without issues that may be encountered by a server application. For example, client computer systems in the same network may communicate with each other without crossing a firewall. As a result, agent applications on these client computer systems may not have the same issues communicating with each other as compared to a server application on a server computer system outside of the network. As another example, some networks may be grouped with each other. These networks may be subnets in which issues with firewalls or other infrastructures may not be present as compared to a server application running on a server computer system outside of those networks.

For example, zone 706 in zones 700 may include network 708 and network 710. As depicted, network 708 includes client computer system 712, and network 710 includes client computer system 714 and client computer system 716.

As a result, if an agent application does not respond to a request from a server application, the zone of the client application may be identified. For example, if zone 706 is identified and the agent application is located on a client computer system in client computer system 714 in network 710, the server application may select an agent application on a client computer system in client computer system 712 to send a command to the agent application to communicate with the server application.

The illustration of information in agent database 446 is not meant to imply limitations to the manner in which agent databases may be implemented. The information illustrated in FIG. 7 is only meant as an example of one manner in which agent database 446 may be implemented.

Figure 8:
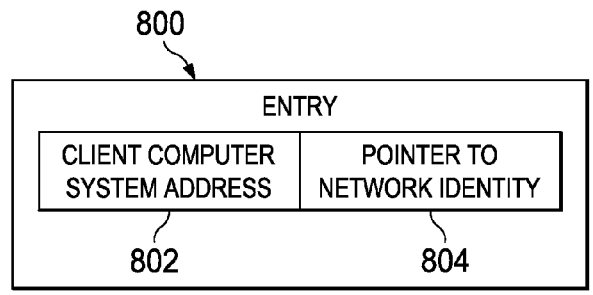
FIG. 8 is an illustration of a client entry in an agent database in accordance with an illustrative embodiment.

Turning now to FIG. 8, an illustration of a client entry in agent database 446 in FIG. 4 is depicted in accordance with an illustrative embodiment. In this illustrative example, entry 800 includes client computer system address 802 and pointer to network identity 804. Client computer system address 802, in these examples, is one or more Internet protocol addresses for the client computer system. Pointer to network identity 804 is a pointer to another entry containing information about the network in which the client computer system is located that has the agent application.

Figure 9:
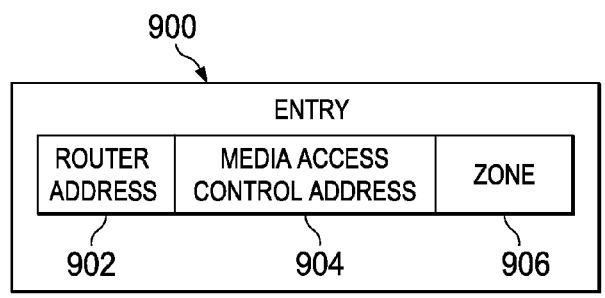
FIG. 9 is an illustration of an entry for a network identity in accordance with an illustrative embodiment.

With reference now to FIG. 9, an illustration of an entry for a network identity is depicted in accordance with an illustrative embodiment. In this illustrative example, entry 900 includes router address 902 and media access control address 904. Router address 902 is one or more Internet protocol addresses for the router to the network in which the client computer system is located. Media access control address 904 is the media access control address for the router.

In many cases, the Internet protocol address of the router may be insufficient for identifying the network. Different networks may use the same default router address, such as 192.168.1.1. In this manner, the media access control address may allow for a unique identification of the network. Entry 900 also includes zone 906. Zone 906 identifies a zone in which the network has been grouped. One or more networks may be present in a zone, depending on the particular implementation. As a result, all client computer systems in a network are located in the same zone in these examples. A zone may include more than one network. In the illustrative examples, networks in the same zone have a common firewall.

Figure 10:
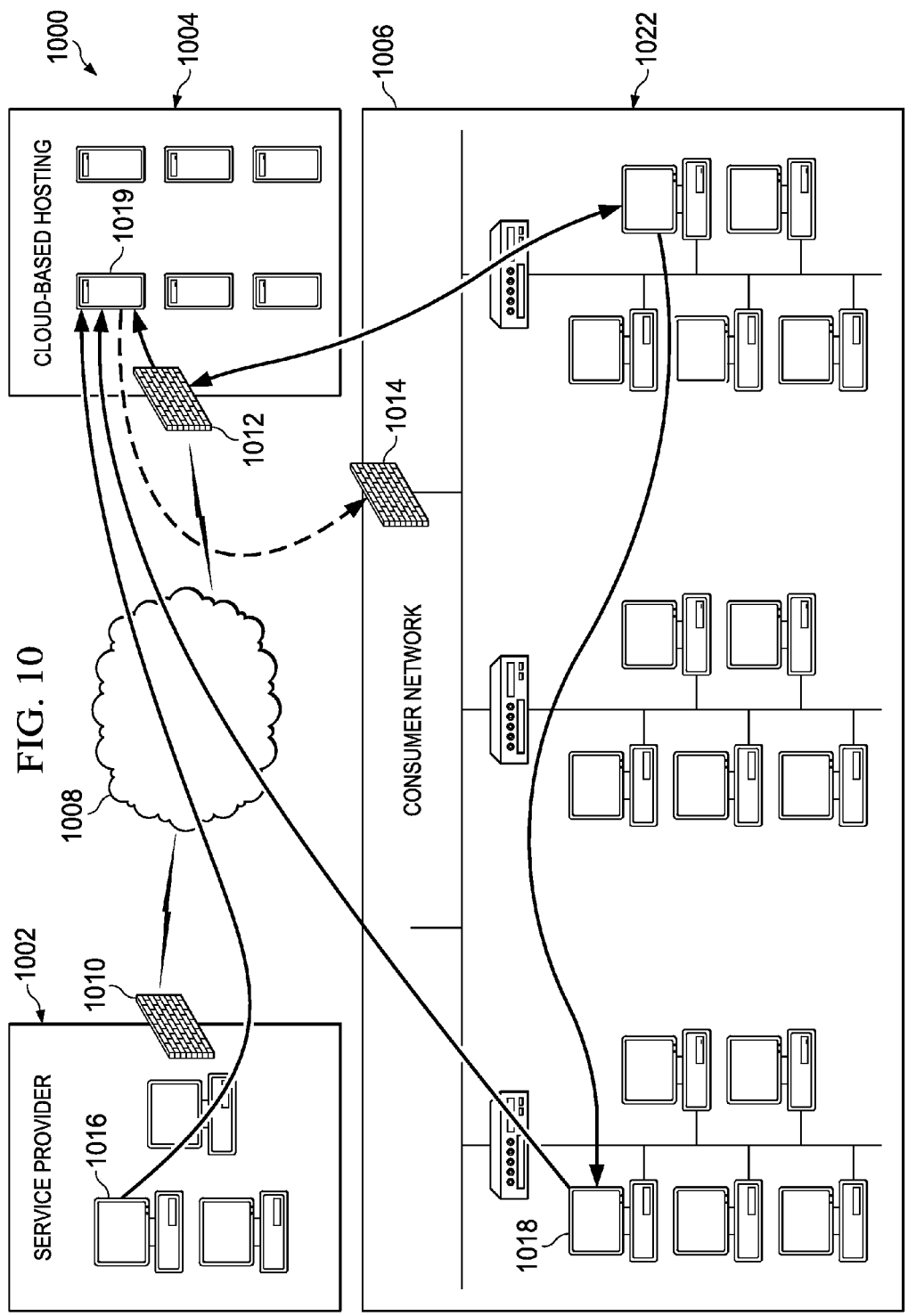
FIG. 10 is an illustration of a communications environment in accordance with an illustrative embodiment.

With reference now to FIG. 10, an illustration of a communications environment is depicted in accordance with an illustrative embodiment. Communications environment 1000 is an example of one implementation of communications environment 400 in FIG. 4. In this illustrative example, communications environment 1000 includes service provider 1002, cloud-based hosting 1004, and customer network 1006. In this illustrative example, service provider 1002, cloud-based hosting 1004, and customer network 1006 are connected to network 1008. Network 1008 may be one or more networks. In these illustrative examples, network 1008 includes the Internet. Service provider 1002 has firewall 1010, cloud-based hosting 1004 has firewall 1012, and customer network 1006 has firewall 1014.

In this illustrative example, an operator uses administrative console computer system 1016 to perform a management operation on client computer system 1018 in customer network 1006. In these depicted examples, these management operations are performed using a server computer system in cloud based hosting 1004. In particular, the request may be sent from administrative console computer system 1016 to server computer system 1019 in cloud-based hosting 1004. In response, this management operation is sent in a request directed to client computer system 1018. The request in this example is blocked by firewall 1014 at customer network 1006.

In this example, client computer system 1018 contacts server computer system 1019. This contact is the scheduled contact through a polling mechanism in client computer system 1022. Client computer system 1022 contacts server computer system 1019 at a time prior to when client computer system 1018 is scheduled to contact server computer system 1019.

In response to this communication, server computer system 1019 sends a command to contact client computer system 1018. In response to receiving this command, client computer system 1022 sends the request to client computer system 1018. Client computer system 1022 is able to communicate with client computer system 1018, because the communication does not travel across firewall 1014 in these illustrative examples.

In turn, client computer system 1018 now contacts server computer system 1019. In this manner, communication with client computer system 1018 may be established more quickly than waiting for client computer system 1018 to contact server computer system 1019 through the normal polling mechanism.

In this example, if the polling interval for computers at customer network 1006 is once an hour, the delay in processing the polling request may be reduced when one of these computers in customer network 1006 contacts server computer system 1019. For example, if client computer system 1018 is not due to contact server computer system 1019 for another 40 minutes, those 40 minutes may be reduced to two minutes, or even seconds, depending on the time at which one of the client computers in customer network 1006 contacts server computer system 1019.

Figure 11:
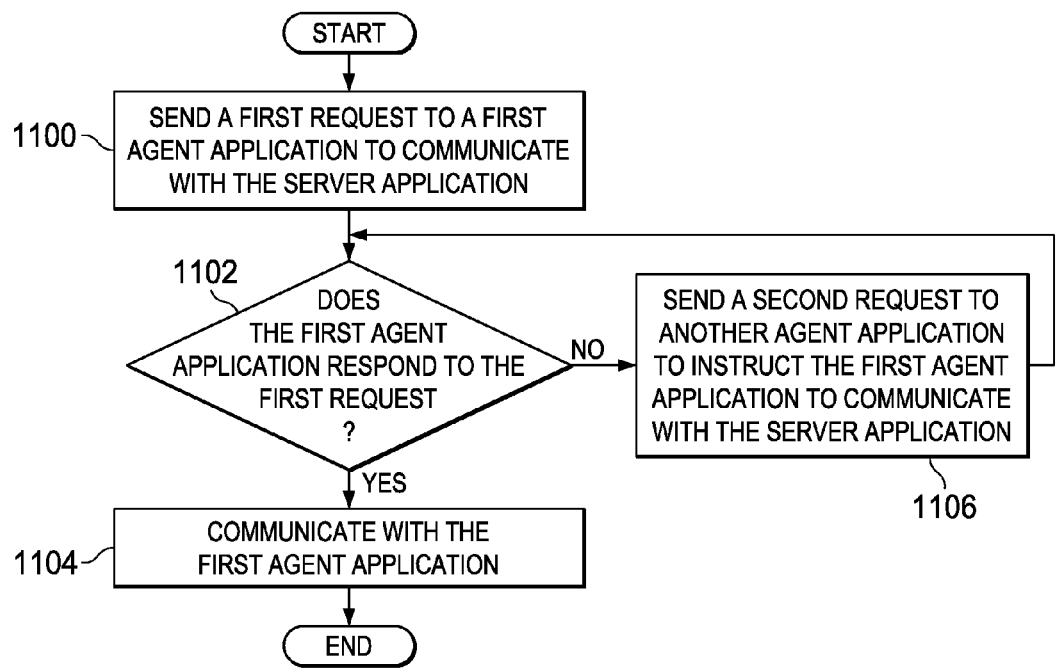
FIG. 11 is an illustration of a flowchart of a process for managing communications with agent applications in accordance with an illustrative embodiment.

With reference now to FIG. 11, a flowchart of a process for managing communications with agent applications is depicted in accordance with an illustrative embodiment. The process illustrated in FIG. 11 may be implemented in communications environment 400 in FIG. 4. More specifically, the different steps illustrated in this flowchart may be implemented as program code for server application 412 in FIG. 4.

The process begins by sending a first request to a first agent application to communicate with the server application (step 1100). In these illustrative examples, the server computer system is the server computer system on which the server application is located. The first agent application is located on a first network.

A determination is made as to whether the first agent application responds to the first request (step 1102). If the first agent application responds to the first request, the server application on the server computer system communicates with the first agent application (step 1104), with the process terminating thereafter.

With reference again to step 1102, if the first agent application fails to respond to the first request, the server application sends a second request to another agent application to instruct the first agent application to communicate with the server application (step 1106). In these illustrative examples, the agent application in step 1106 is located in the same zone as the first agent application. The process then returns to step 1102. The agent application in step 1106 may be located in the same network of another network as the first agent application. In these examples, agent applications in the same zone may have the same communication problems as the server application. For example, the different agent applications in the same zone may not have an intervening firewall between them. The agent applications may be on different networks, such as different subnets, in which a firewall is not present between the two subnets.

In sending the request in step 1106, a different agent may be used each time the process loops back through step 1106 in these illustrative examples. In this manner, a request may be made to every agent application until the original agent application makes contact with the server application.

Figure 12:
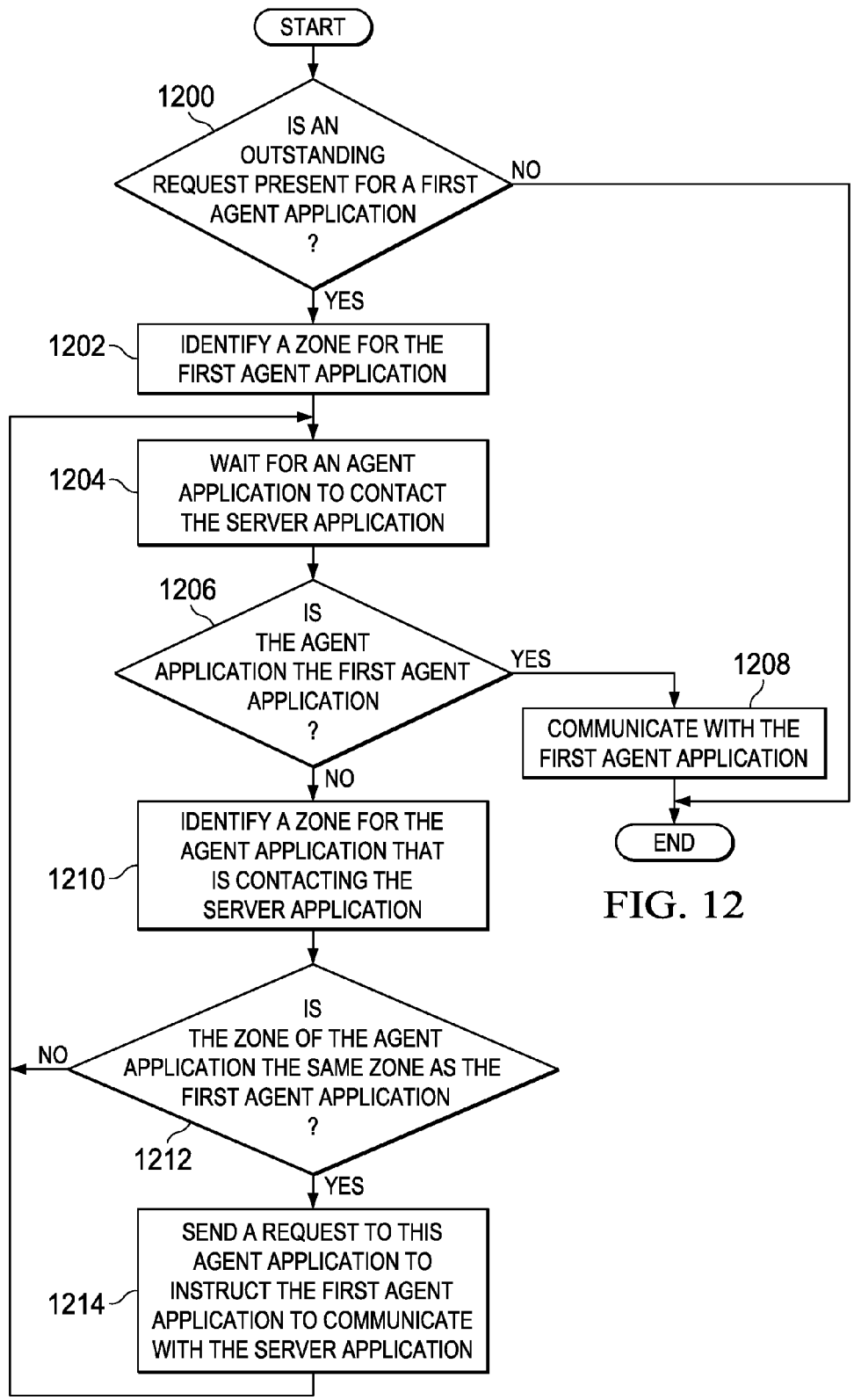
FIG. 12 is an illustration of a flowchart of a process for managing communications with agent applications in accordance with an illustrative embodiment.

Turning next to FIG. 12, a flowchart of a process for managing communications with agent applications is depicted in accordance with an illustrative embodiment. The process depicted in FIG. 12 may be implemented as program code in server application 412 in FIG. 4.

The process begins by determining whether an outstanding request is present for a first agent application (step 1200). This request is a request sent to the first agent application from the server application in these illustrative examples. The outstanding request may be a flag set for a particular network. If an outstanding request is not present, the process terminates.

Otherwise, if an outstanding request to the first agent application is present, the process identifies a zone for the first agent application (step 1202). In this example, the zone may be identified using agent database 446 in FIG. 4.

The process then waits for an agent application to contact the server application (step 1204). When an agent application contacts the server application, a determination is made as to whether the agent application is the first agent application (step 1206). If the agent application is the first agent application, the process communicates with the first agent application (step 1208), with the process terminating thereafter.

With reference again to step 1206, if the agent application is not the first agent application, the process identifies a zone for the agent application that is contacting the server application (step 1210). A determination is made as to whether the zone of the agent application is the same zone as the first agent application (step 1212). If the agent application is the same zone, the process sends a request to this agent application to instruct the first agent application to communicate with the server application (step 1214). The process then returns to step 1204 as described above. The process also returns to step 1204 if the agent application is not the same zone as the first agent application in step 1212.

Figure 13:
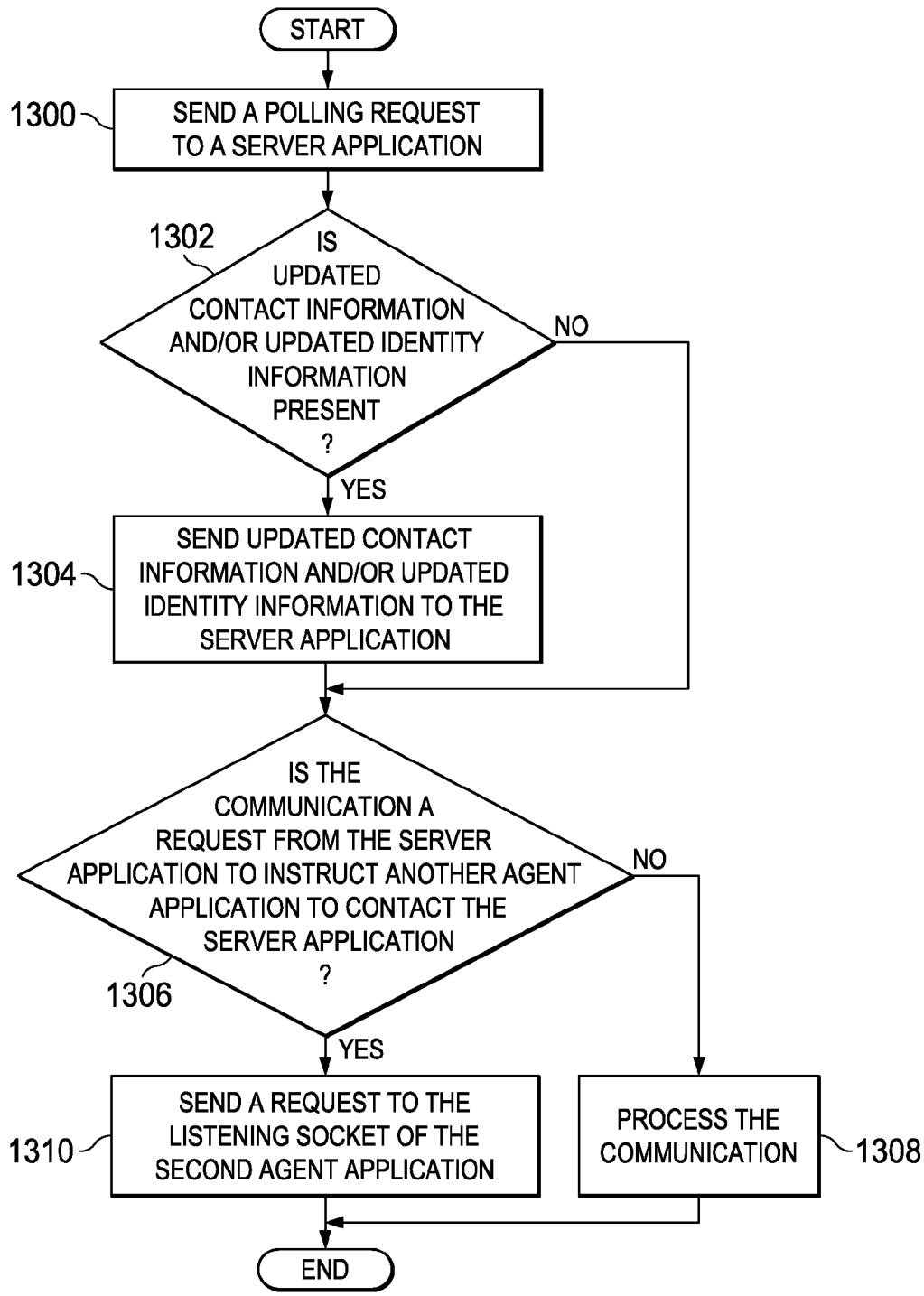
FIG. 13 is an illustration of a flowchart of a process for processing a server application in accordance with an illustrative embodiment.

With reference now to FIG. 13, a flowchart of a process for processing a server application is depicted in accordance with an illustrative embodiment. The process illustrated in FIG. 13 may be implemented in program code in an agent application, such as agent application 416 or agent application 430 in FIG. 4. In these illustrative examples, this process may be initiated by the agent application sending a polling request based on a polling interval. In other examples, this process may be performed in response to receiving a request on a listening socket from a server application.

The process begins by sending a polling request to a server application (step 1300). A determination is made as to whether updated contact information and/or updated identity information is present (step 1302). If updated contact information and/or updated identity information is present, the process then sends updated contact information and/or updated identity information to the server application (step 1304).

A determination is made as to whether the communication is a request from the server application to instruct another agent application to contact the server application (step 1306). The process also proceeds to step 1306 from step 1302 if updated information is not present.

If the request is not to instruct the agent application to contact the other agent application, the communication is processed (step 1308), with the process terminating thereafter. This processing may include performing updates, deleting files, changing configurations, and other suitable operations.

With reference again to step 1306, if the request is to instruct the agent application to contact the other agent application, the process then sends a request to the listening socket of the second agent application (step 1310), with the process then proceeding to step 1308. In this case, the agent application processes remaining portions of the communication that may be present in addition to the request. In these illustrative examples, the request received from the server application includes an address of the other agent application. This information is used to send the request to the listening socket of the other agent application.

This request sent to the listening socket includes the information for the server application. In this manner, an agent application may help a server application cause the other agent application that cannot be reached by the server application to contact the server application.

Figure 14:
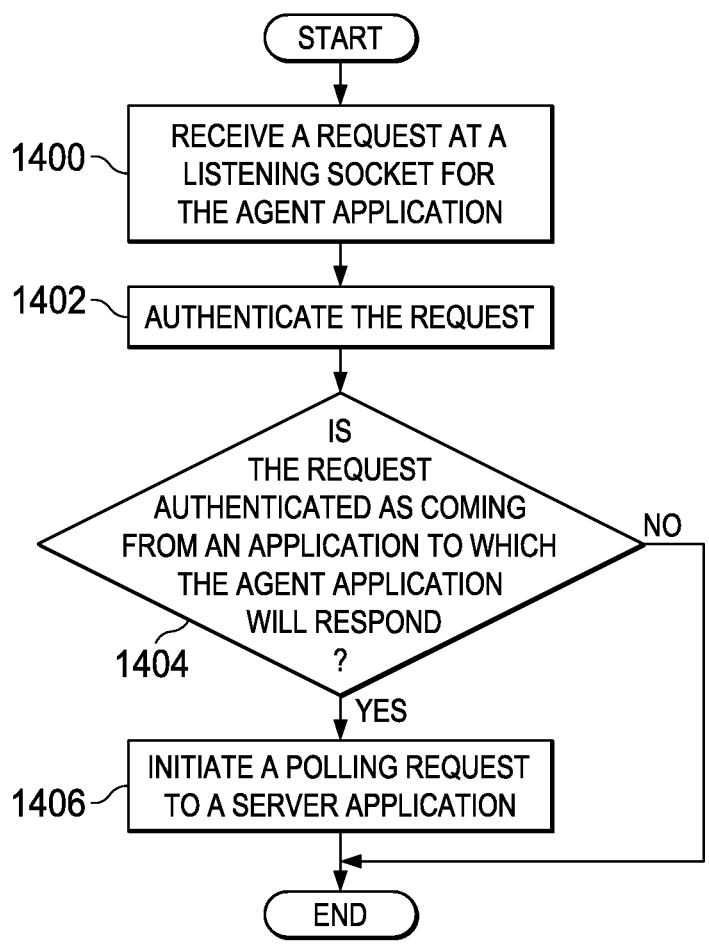
FIG. 14 is an illustration of a flowchart of a process for managing a request received over a listening socket in accordance with an illustrative embodiment.

With reference now to FIG. 14, a flowchart of a process for managing a request received over a listening socket is depicted in accordance with an illustrative embodiment. The process illustrated in FIG. 14 may be implemented in program code in an agent application, such as agent application 416 or agent application 430 in FIG. 4.

The process begins by receiving a request at a listening socket for the agent application (step 1400). The process then authenticates the request (step 1402). This authentication may include, for example, examining a certificate or other credentials sent in the request. A determination is made as to whether the request is authenticated as coming from an application to which the agent application will respond (step 1404). If the request is authenticated, the process then initiates a polling request to a server application (step 1406), with the process terminating thereafter. This polling request is sent to a server application assigned to the agent application. In some cases, the polling request is made to the application identified in the request. For example, an Internet protocol address may be included in the request.

With reference again to step 1404, if the request is not authenticated, the process terminates. In this manner, reduced traffic may occur when unauthorized requests, such as those generated by denial of service attacks, occur.

The flowcharts and block diagrams in the different depicted embodiments illustrate the architecture, functionality, and operation of some possible implementations of apparatus, methods, and computer program products. In this regard, each block in the flowcharts or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be processed substantially concurrently, or the blocks may sometimes be processed in the reverse order, depending upon the functionality involved.

For example, the authentication steps in FIG. 14 may be omitted in some implementations. As yet another example, an authentication step is not depicted for contacting the listening socket in FIG. 14. Authentication may be added for contacts to listening sockets in this figure.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application and to enable others of ordinary skill in the art to understand the invention for various embodiments with various modifications as are suited to the particular use contemplated.

What is claimed is:

1. A computer system comprising:
a bus system;
a storage device connected to the bus system;
a processor unit; and
program code stored on the storage device, wherein a first agent application on the computer system is configured to process the program code to receive a first request from a server application to request to instruct a second agent application on a client computer system to communicate with the server application and send a second request to the second agent application on the client computer system to instruct the second agent application to communicate with the server application in response to receiving the first request.

2. The computer system of claim 1, wherein in being configured to process the program code to send the second request, the first agent application is configured to process the program code to send the second request to a listening socket used by the second agent application on the client computer system.

3. The computer system of claim 1, wherein the second request includes an address for the server application.

4. The computer system of claim 1, wherein in being configured to process the program code to send the second request, the first agent application is configured to process the program code to identify an address for the second agent application from the first request and send the second request to the address for the second agent application.

5. The computer system of claim 1, wherein the first agent application further processes the program code to send a polling request to the server application and send contact information and identity information to the server application, wherein the first agent application functions as a proxy for the server application when the server application is unable to reach the second agent application.

6. The computer system of claim 1, wherein the first agent application further processes the program code to authenticate the first request received by the first agent application as being from the server application and prevent the sending of the second request to the second agent application on the client computer system in response to an absence of authentication of the server application.

7. The computer system of claim 6, wherein the first agent application further processes the program code to send a polling request to the server application in response to authenticating the first request as being from the server application.

8. The computer system of claim 1, wherein the first agent application is configured to communicate with the second agent application even when the server application is unable to communicate with the second agent application.

9. The computer system of claim 1, wherein the first agent application further processes the program code to receive an initial request from the server application, and in response thereto initiate communication with the server application.

10. A computer program product comprising:
a non-transitory computer readable storage medium;
first program code for receiving at a first agent application on a computer system a first request from a server application to request the computer system to instruct a second agent application on a client computer system to communicate with the server application; and
second program code, responsive to receiving the first request, for sending, by the first agent application, a second request to instruct the second agent application on the client computer system to communicate with the server application, wherein the first program code and the second program code are stored on the computer readable storage medium.

11. The computer program product of claim 10, wherein the second program code comprises:
program code for sending the second request to a listening socket used by the second agent application on the client computer system.

12. The computer program product of claim 10, wherein the second request includes an address for the server application.

13. The computer program product of claim 10, wherein the second program code comprises:
program code for identifying an address for the second agent application from the first request; and
program code for sending the second request to an address for the server application.

14. The computer program product of claim 10 further comprising:
third program code for sending a polling request to the server application; and
fourth program code for sending contact information and identity information to the server application, wherein the first agent application functions as a proxy for the server application when the server application is unable to reach the second agent application, wherein the third program code and the fourth program code are stored on the computer readable storage medium.

15. The computer program product of claim 10, wherein the non-transitory computer readable storage medium is in the computer system, and the first program code and the second program code are downloaded over a network from a remote data processing system to the non-transitory computer readable storage medium in the computer system.

16. The computer program product of claim 10, wherein the non-transitory computer readable storage medium is a first non-transitory computer readable storage medium, wherein the first non-transitory computer readable storage medium is in a server computer system, and wherein the first program code and the second program code are downloaded over a network to a remote computer system for use in a second non-transitory computer readable storage medium in the remote computer system.

17. The computer program product of claim 10, wherein the first agent application is configured to communicate with the second agent application even when the server application is unable to communicate with the second agent application.

18. The computer program product of claim 10, further comprising third program code for receiving by the first agent application an initial request from the server application, and in response thereto initiating communication with the server application.

* * * * *